US012370611B2

(12) United States Patent
Rentmeester et al.

(10) Patent No.: US 12,370,611 B2
(45) Date of Patent: Jul. 29, 2025

(54) POWER TOOL HYDRAULIC SYSTEM

(71) Applicant: MILWAUKEE ELECTRIC TOOL CORPORATION, Brookfield, WI (US)

(72) Inventors: Mathew R. Rentmeester, Milwaukee, WI (US); John N. Reeve, Milwaukee, WI (US); Daniel R. Garces, Waukesha, WI (US); Brennan L. Mach, Milwaukee, WI (US); Adam C. Frey, Racine, WI (US); Brian J. Hyde, Brookfield, WI (US); Harrison T. Snyder, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/211,440

(22) Filed: Jun. 19, 2023

(65) Prior Publication Data

US 2023/0405789 A1 Dec. 21, 2023

Related U.S. Application Data

(60) Provisional application No. 63/366,580, filed on Jun. 17, 2022.

(51) Int. Cl.
*B23D 15/12* (2006.01)
*B23D 29/02* (2006.01)
(Continued)

(52) U.S. Cl.
CPC .............. *B23D 15/12* (2013.01); *B23D 29/02* (2013.01); *B25F 5/005* (2013.01); *B25F 5/02* (2013.01); *B23D 29/005* (2013.01)

(58) Field of Classification Search
CPC ................................. B23D 15/12; B23D 29/02
(Continued)

(56) References Cited

U.S. PATENT DOCUMENTS 975,112 A 11/1910 Bilcsik
1,998,556 A 4/1935 Daniel
(Continued)

FOREIGN PATENT DOCUMENTS

CA 2276054 C 11/2008
CN 1010289 B 11/1990
(Continued)

OTHER PUBLICATIONS

Thorne & Derrick, "Ridgid® StrutSlayr™ | The Strongest Most Powerful Strut & Unistrut Channel Cutter," <https://www.youtube.com/watch?v=gCJaWN9n9QU&t=1s> YouTube video publication date: Nov. 17, 2020 (1 page).
(Continued)

*Primary Examiner* — Praachi M Pathak
(74) *Attorney, Agent, or Firm* — Michael Best & Friedrich LLP

(57) ABSTRACT

The present disclosure provides a power tool including a housing and a hydraulic drive assembly at least partially supported in the housing. The housing includes a handle that supports a switch that activates the tool. The hydraulic drive assembly includes a pump assembly operably coupled to the motor assembly, a reservoir configured to contain hydraulic fluid in fluid communication with the pump assembly and in which a baffle is supported, a cylinder in fluid communication with the pump assembly which supports an auto-return valve therein, and a piston disposed in the cylinder and biased to a first position by a piston spring. The pump assembly includes a manifold housing that at least partially defines an inlet passageway that fluidly communicates the pump assembly and the cylinder and supports an inlet check valve.

18 Claims, 7 Drawing Sheets

(51) Int. Cl.
  *B25F 5/00* (2006.01)
  *B25F 5/02* (2006.01)
  *B23D 29/00* (2006.01)

(58) Field of Classification Search
  USPC .......................................................... 173/218
  See application file for complete search history.

(56) References Cited

U.S. PATENT DOCUMENTS

| | | | |
|---|---|---|---|
| 2,366,987 A | 1/1945 | Soutar | |
| 2,680,294 A | 6/1954 | Shoffner | |
| 2,695,059 A | 11/1954 | Ernst | |
| 2,707,374 A | 5/1955 | Ericson | |
| 2,728,391 A | 12/1955 | Werner et al. | |
| 2,776,003 A | 1/1957 | Koster | |
| 2,782,798 A | 2/1957 | Ericson | |
| 2,789,639 A | 4/1957 | Lorentzen | |
| 2,840,210 A | 6/1958 | Lorentzen | |
| 2,884,063 A | 4/1959 | Stover | |
| 3,043,178 A | 7/1962 | Lorentzen | |
| 3,227,026 A | 1/1966 | Werntz | |
| 3,391,591 A | 7/1968 | Funke | |
| 3,452,632 A | 7/1969 | Brolund | |
| 3,494,233 A | 2/1970 | Kojima | |
| 3,513,740 A | 5/1970 | Burghart | |
| 3,664,221 A | 5/1972 | Breetvelt | |
| 3,678,724 A | 7/1972 | Stone et al. | |
| 3,750,509 A | 8/1973 | Kruse | |
| 3,760,678 A | 9/1973 | Stolzer | |
| 3,788,173 A | 1/1974 | Keigley | |
| 3,848,499 A | 11/1974 | Tanaka | |
| 3,854,358 A | 12/1974 | Kruse | |
| 3,886,825 A | 6/1975 | Tanaka | |
| 3,893,357 A | 7/1975 | Zahlaus | |
| 3,921,399 A | 11/1975 | Ishihara | |
| 4,055,096 A | 10/1977 | Borzym | |
| 4,067,252 A | 1/1978 | Peddinghaus et al. | |
| 4,092,891 A | 6/1978 | Hansen et al. | |
| 4,130,037 A | 12/1978 | Matthews | |
| 4,171,616 A | 10/1979 | Keigley | |
| 4,189,966 A | 2/1980 | Keigley | |
| 4,218,946 A | 8/1980 | Witzler | |
| 4,267,756 A | 5/1981 | Muhr et al. | |
| 4,293,012 A | 10/1981 | Pierrat | |
| 4,300,605 A | 11/1981 | Pierrat | |
| 4,314,591 A | 2/1982 | Pierrat | |
| 4,377,190 A | 3/1983 | Pierrat | |
| 4,385,538 A | 5/1983 | Bieri et al. | |
| 4,468,995 A | 9/1984 | Mireles-Saldivar | |
| 4,553,610 A | 11/1985 | Pelto-Huikko et al. | |
| 4,638,703 A | 1/1987 | Muhr | |
| 4,685,365 A | 8/1987 | Muhr et al. | |
| 4,787,283 A | 11/1988 | Foster | |
| 4,844,114 A | 7/1989 | Moberg et al. | |
| 4,875,274 A | 10/1989 | Foster | |
| 5,142,958 A | 9/1992 | Nordlin et al. | |
| 5,233,749 A | 8/1993 | Saito et al. | |
| 5,458,717 A | 10/1995 | Kurita | |
| 5,524,714 A | 6/1996 | Kimberlin et al. | |
| 5,582,257 A | 12/1996 | Kimberlin et al. | |
| 5,586,606 A | 12/1996 | Kimberlin et al. | |
| 5,630,277 A | 5/1997 | Kimura | |
| 5,791,222 A | 8/1998 | Micouleau | |
| 5,799,557 A | 9/1998 | Wang | |
| 5,806,394 A | 9/1998 | Marocco | |
| 5,816,126 A | 10/1998 | Pluber | |
| 5,832,807 A | 11/1998 | Rausch et al. | |
| 5,875,629 A | 3/1999 | Kimura | |
| 5,934,166 A | 8/1999 | Herlihy | |
| 5,943,930 A | 8/1999 | Fasske | |
| 5,974,926 A | 11/1999 | Kimura | |
| 6,089,134 A | 7/2000 | Marocco | |
| 6,116,131 A | 9/2000 | Fasske | |
| 6,167,789 B1 | 1/2001 | Daniels et al. | |
| 6,178,857 B1 | 1/2001 | Marocco | |
| 6,196,099 B1 | 3/2001 | Marocco | |
| 6,230,542 B1 | 5/2001 | Frenken | |
| 6,240,824 B1 | 6/2001 | Hsu | |
| 6,276,186 B1 | 8/2001 | Frenken | |
| 6,279,367 B1 | 8/2001 | Mehara et al. | |
| 6,314,851 B1 | 11/2001 | Graves et al. | |
| 6,336,388 B1 | 1/2002 | Marocco | |
| 6,370,773 B1 | 4/2002 | Ellis et al. | |
| 6,401,515 B2 | 6/2002 | Frenken | |
| 6,439,089 B1 | 8/2002 | Fasske | |
| 6,532,790 B2 | 3/2003 | Frenken | |
| 6,553,878 B2 | 4/2003 | Gosis et al. | |
| D488,695 S | 4/2004 | Peterson | |
| 6,758,120 B2 | 7/2004 | Marocco | |
| 6,840,146 B2 | 1/2005 | Gosis et al. | |
| 6,869,000 B2 | 3/2005 | Bauer et al. | |
| 6,945,152 B2 | 9/2005 | Jabbari et al. | |
| 7,017,459 B2 | 3/2006 | Marocco | |
| 7,107,889 B2 | 9/2006 | Marocco | |
| 7,114,421 B2 | 10/2006 | Marocco | |
| 7,124,672 B2 | 10/2006 | Marocco | |
| 7,216,573 B2 | 5/2007 | Friend | |
| 7,219,586 B1 | 5/2007 | Daniels | |
| 7,444,910 B2 | 11/2008 | Marocco | |
| 7,506,567 B2 | 3/2009 | Simokovic | |
| 7,610,835 B2 | 11/2009 | Marocco | |
| 7,634,859 B2 | 12/2009 | Amherd | |
| 7,918,150 B2 | 4/2011 | Marocco | |
| 8,171,832 B2 | 5/2012 | Lee | |
| D681,703 S | 5/2013 | Miller et al. | |
| 9,227,254 B2 | 1/2016 | Westley | |
| 9,755,466 B2 | 9/2017 | Ions et al. | |
| 10,213,821 B2 | 2/2019 | Thorson et al. | |
| 10,226,826 B2 | 3/2019 | Kehoe et al. | |
| 10,265,758 B2 | 4/2019 | Skinner et al. | |
| 10,266,826 B2 | 4/2019 | Orkin et al. | |
| D866,623 S | 11/2019 | Fenske | |
| 10,471,578 B2 | 11/2019 | Barezzani | |
| D877,215 S | 3/2020 | Brandt Sanz et al. | |
| D878,435 S | 3/2020 | Fenske | |
| 10,576,557 B2 | 3/2020 | Fenske | |
| 10,651,636 B2 | 5/2020 | Brown et al. | |
| 10,760,266 B2 | 9/2020 | Sacks et al. | |
| D915,478 S | 4/2021 | De Geyter | |
| 10,974,306 B2 | 4/2021 | Skinner et al. | |
| D921,720 S | 6/2021 | Larsen et al. | |
| 11,034,036 B2 | 6/2021 | Kundracik et al. | |
| 11,072,029 B2 | 7/2021 | Fenske | |
| D933,112 S | 10/2021 | Sun | |
| D939,659 S | 12/2021 | Vilter | |
| 11,241,780 B2 | 2/2022 | Kamijo | |
| D967,693 S | 10/2022 | Brunner et al. | |
| D1,012,142 S | 1/2024 | Meves et al. | |
| 2001/0039868 A1 | 11/2001 | Graves et al. | |
| 2002/0029674 A1 | 3/2002 | Graves et al. | |
| 2002/0157512 A1 | 10/2002 | Fasske | |
| 2003/0029295 A1 | 2/2003 | Yoshimizu et al. | |
| 2003/0066403 A1 | 4/2003 | Lin et al. | |
| 2004/0226422 A1 | 11/2004 | Marocco | |
| 2005/0000345 A1 | 1/2005 | Schimmels | |
| 2005/0166740 A1 | 8/2005 | Marocco | |
| 2006/0150793 A1 | 7/2006 | Marocco | |
| 2007/0271992 A1 | 11/2007 | Amherd | |
| 2010/0095826 A1 | 4/2010 | Sullivan | |
| 2017/0252911 A1 | 9/2017 | Barezzani et al. | |
| 2018/0272445 A1 | 9/2018 | Perkins | |
| 2019/0151965 A1 | 5/2019 | Fenske | |
| 2019/0151967 A1 | 5/2019 | Kehoe et al. | |
| 2020/0171683 A1 | 6/2020 | Kundracik et al. | |
| 2020/0198030 A1 | 6/2020 | Fenske | |
| 2020/0220337 A1 | 7/2020 | Brown et al. | |
| 2021/0245227 A1 | 8/2021 | Skinner et al. | |
| 2022/0234231 A1 | 7/2022 | Krohlow et al. | |
| 2023/0405692 A1 | 12/2023 | Rentmeester et al. | |

FOREIGN PATENT DOCUMENTS

| | | |
|---|---|---|
| CN | 2617506 Y | 5/2004 |
| CN | 2696755 Y | 5/2005 |

(56) References Cited

FOREIGN PATENT DOCUMENTS

| | | |
|---|---|---|
| CN | 201728420 U | 2/2011 |
| CN | 203426522 U | 2/2014 |
| CN | 204591839 U | 8/2015 |
| CN | 204716675 U | 10/2015 |
| CN | 208991547 U | 6/2019 |
| CN | 210799543 U | 6/2020 |
| CN | 114001069 A | 2/2022 |
| DE | 328474 C | 5/1921 |
| DE | 344943 C | 12/1921 |
| DE | 370642 A | 3/1923 |
| DE | 470610 C | 1/1929 |
| DE | 802675 C | 2/1951 |
| DE | 1791474 U | 7/1959 |
| DE | 1904848 U | 11/1964 |
| DE | 1943214 U | 7/1966 |
| DE | 1953865 U | 1/1967 |
| DE | 1964060 U | 7/1967 |
| DE | 1552644 A1 | 1/1970 |
| DE | 1652767 A1 | 9/1971 |
| DE | 2032742 A1 | 1/1972 |
| DE | 2124862 A1 | 11/1972 |
| DE | 2145264 A1 | 3/1973 |
| DE | 2204236 A1 | 8/1973 |
| DE | 2220043 A1 | 11/1973 |
| DE | 2345479 A1 | 4/1975 |
| DE | 2526199 A1 | 4/1976 |
| DE | 2556364 A1 | 10/1976 |
| DE | 1923203 B2 | 7/1977 |
| DE | 2609417 A1 | 9/1977 |
| DE | 2950033 A1 | 9/1981 |
| DE | 8331882 U1 | 4/1984 |
| DE | 3302499 A1 | 7/1984 |
| DE | 3432544 A1 | 3/1986 |
| DE | 3440276 C2 | 2/1987 |
| DE | 8812810 U1 | 11/1988 |
| DE | 3915367 A1 | 11/1990 |
| DE | 9004938 U1 | 8/1991 |
| DE | 9004940 U1 | 8/1991 |
| DE | 9004955 U1 | 8/1991 |
| DE | 9204329 U1 | 6/1992 |
| DE | 4201245 A1 | 7/1993 |
| DE | 9316969 U1 | 1/1994 |
| DE | 4324627 C1 | 3/1995 |
| DE | 29511552 U1 | 9/1995 |
| DE | 3707175 C2 | 11/1996 |
| DE | 19526070 A1 | 1/1997 |
| DE | 19548755 A1 | 6/1997 |
| DE | 29706182 U1 | 6/1997 |
| DE | 29711282 U1 | 8/1997 |
| DE | 29815418 U1 | 3/1999 |
| DE | 19537994 C2 | 2/2000 |
| DE | 10317185 A1 | 11/2004 |
| DE | 202004001662 U1 | 6/2005 |
| DE | 102015007608 A1 | 12/2015 |
| DE | 102019217816 A1 | 6/2020 |
| EP | 1561533 B1 | 6/2009 |
| EP | 2524756 A1 | 11/2012 |
| EP | 2448720 B1 * | 3/2013 | ............. B21D 22/02 |
| EP | 2641683 A1 | 9/2013 |
| EP | 3486013 A1 | 5/2019 |
| WO | WO2021046197 A1 | 3/2021 |

OTHER PUBLICATIONS

Greenlee, "Greenlee 158SSTRT 1-5/8"×1-5/8" and 1-5/8"×7/8" Single Strut Dies for 30T Shear," available at <https://www.electricianshop.com/products/greenlee-158sstrt-1-5-8-x-1-5-8-and-1-5-8-x-7-8-single-strut-dies-for-30t-shear?variant=14087827456058> web page visited Aug. 27, 2023 (3 pages).

Wilton, "Wilton Cutting Shear Components," available at <https://www.summitracing.com/parts/wtn-28934> web page visited Aug. 27, 2023 (3 pages).

Extended European Search Report for Application No. 23179821.6 dated Feb. 21, 2024 (10 pages).

\* cited by examiner

POWER TOOL HYDRAULIC SYSTEM

CROSS-REFERENCE TO RELATED APPLICATIONS

This application claims priority to U.S. Provisional Patent Application No. 63/366,580, filed on Jun. 17, 2022, the entire content of which is incorporated herein by reference.

FIELD

The present disclosure relates to a power tool, in particular, a hydraulic system of a power tool.

SUMMARY

The present disclosure provides, in one aspect, a power tool including a housing and a hydraulic drive assembly at least partially supported in the housing. The housing includes a handle that supports a switch that activates the tool. The hydraulic drive assembly includes a pump assembly operably coupled to the motor assembly, a reservoir configured to contain hydraulic fluid in fluid communication with the pump assembly and in which a baffle is supported, a cylinder in fluid communication with the pump assembly which supports an auto-return valve therein, and a piston disposed in the cylinder and biased to a first position by a piston spring. The pump assembly includes a manifold housing that at least partially defines an inlet passageway that fluidly communicates the pump assembly and the cylinder and supports an inlet check valve.

The present disclosure provides, in another aspect, a method of operating a tool including activating a motor assembly which operates a pump assembly. The pump assembly thereby generates a flow of a hydraulic fluid from a reservoir to a cylinder through a inlet passageway. An auto-return valve is sealed thereby closing an outlet passageway from the cylinder to the reservoir. The hydraulic pressure of the hydraulic fluid is reduced in the inlet passageway, and the auto-return valve is opened in response to reduction of the hydraulic pressure in the inlet passageway, thereby opening the outlet passageway and allowing the hydraulic fluid to flow from the cylinder to the reservoir.

The present disclosure provides, in another aspect, a hydraulic drive assembly of a power tool including a motor assembly operable to provide a rotational output, a gear assembly configured to receive the rotational output from the motor assembly, a pump assembly operably coupled to the gear assembly and configured to generate a flow of hydraulic fluid, a reservoir in fluid communication with the pump assembly and configured to store hydraulic fluid, a baffle supported in the reservoir, and a cylinder in which the piston is slidably supported. The piston is slidable from a first position. The cylinder is in fluid communication with the reservoir via inlet and outlet passageways. The outlet passageway includes an outlet directed toward the baffle.

The present disclosure provides, in yet another aspect, a power tool including a motor assembly, a gear assembly, a pump assembly, a pressure sensor, a cylinder, and a tool controller. The gear assembly is operably coupled to the motor assembly and receives a rotational output therefrom. The pump assembly is operably coupled to the gear assembly and is configured to generate a flow of hydraulic fluid from and inlet passageway at least partially disposed in the pump assembly. The pressure sensor is at least partially disposed in the inlet passageway and configured to measure hydraulic pressure of hydraulic fluid in the inlet passageway.

The cylinder is in fluid communication with the pump assembly. The tool controller is configured to monitor the hydraulic pressure, implement a counter upon the hydraulic pressure exceeding a pressure threshold, and disable operation of the power tool upon the counter exceeding a tool threshold.

The present disclosure provides, in still another aspect, a method of operating a power tool including activating the power tool, generating a flow of hydraulic fluid, measuring a hydraulic pressure of the hydraulic fluid, incrementing a counter upon the hydraulic pressure exceeding a pressure threshold, and disabling activation of the power tool upon the counter exceeding a tool threshold.

Other features and aspects of the disclosure will become apparent by consideration of the following detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
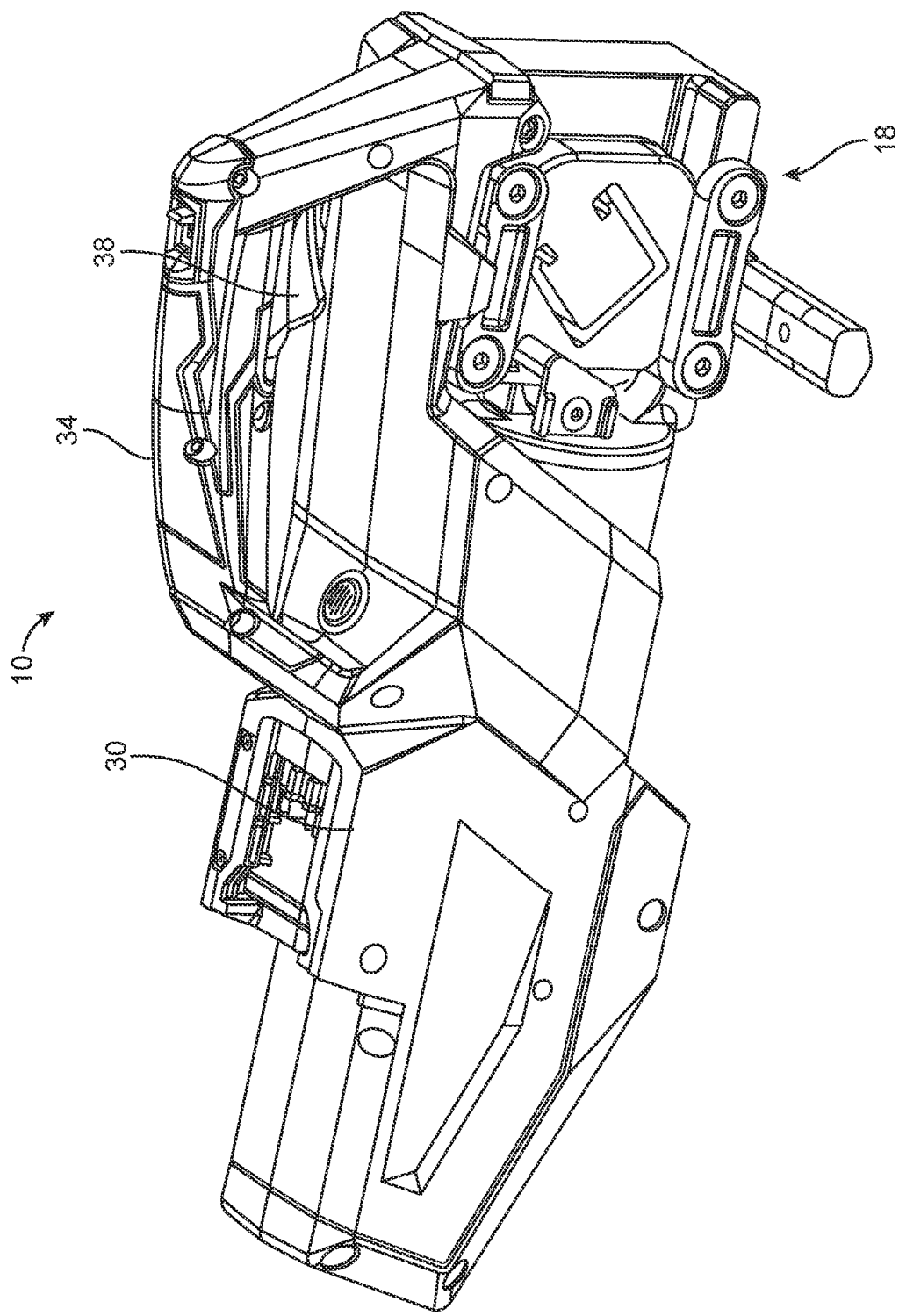
FIG. 1 is an illustration of an exemplary power tool incorporating the power tool hydraulic system of the present disclosure.
Figure 2:
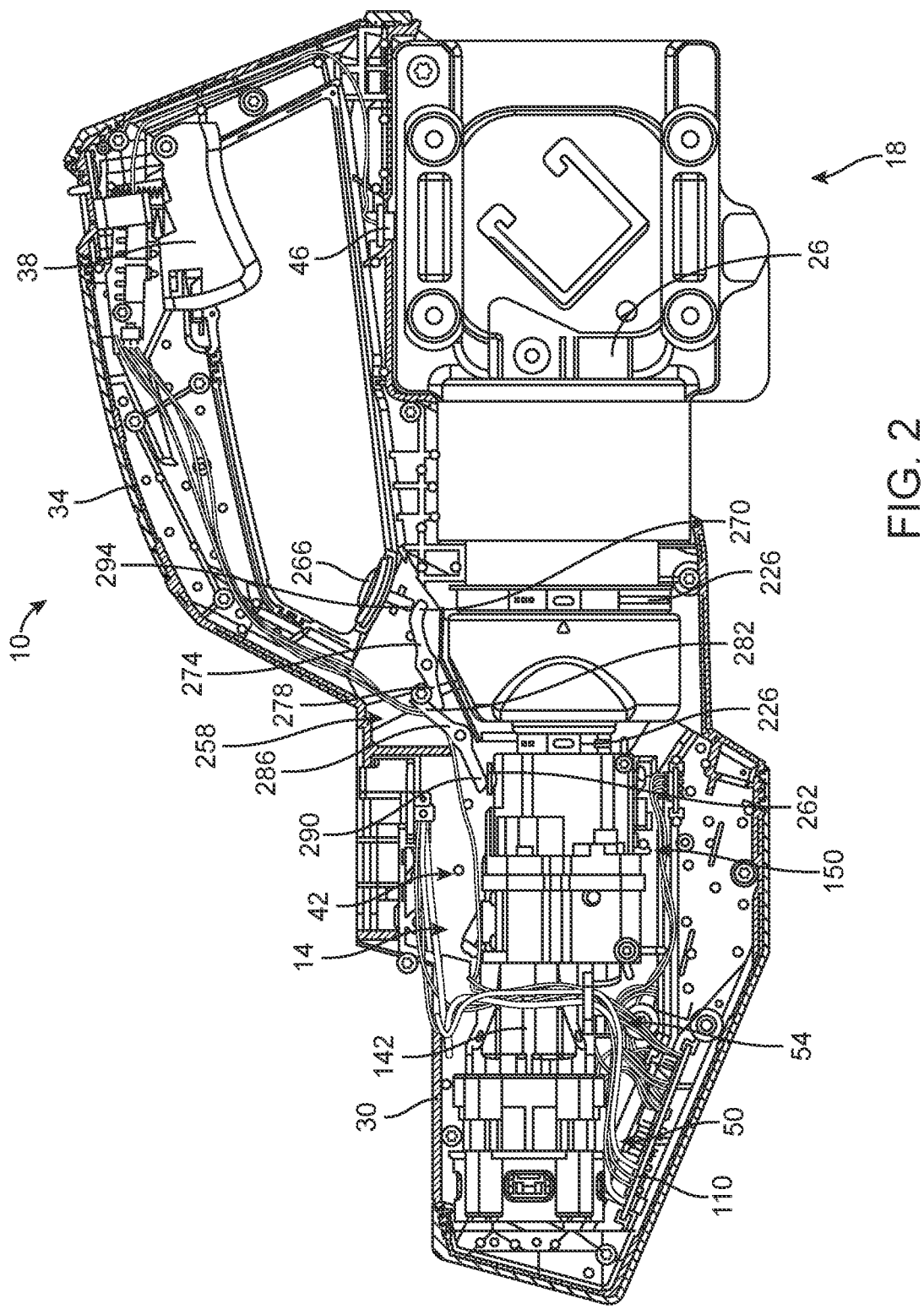
FIG. 2 is a section view of the power tool of FIG. 1 incorporating the power tool hydraulic system of the present disclosure.

FIGS. 1 and 2 illustrate a power tool 10 in which a hydraulic drive assembly 14 according to the present disclosure can be incorporated. The illustrated tool is a shear cutter, but other tools (e.g., a crimping tool, a wire cutter/shears cutting tool, etc.) that incorporate a hydraulic drive assembly 14 to perform an operation via a tool output portion 18 in response to the linear advancement of a piston 22 (FIG. 5) may be other, non-limiting exemplary tools. The illustrated tool 10 includes a tool output portion 18 (e.g., a head assembly) having a ram 26 that is linearly advanced to cut a metallic strut (not pictured) to a desired length by shearing the strut.

The tool 10 includes a housing 30 from which a handle 34 extends. The handle 34 supports a switch 38 (e.g., a trigger switch) that is operable to activate the tool 10. The tool 10 also supports a rechargeable battery (e.g., a 12V battery pack, an 18V battery pack, or other size battery pack, not shown), which provides a source of power for operation of the tool 10. The housing 30 defines an interior 42, which may be formed by two clamshell halves. Work lights 46 (e.g., LEDs) are supported within the interior 42, for instance, adjacent the tool output portion 18.

Figure 3:
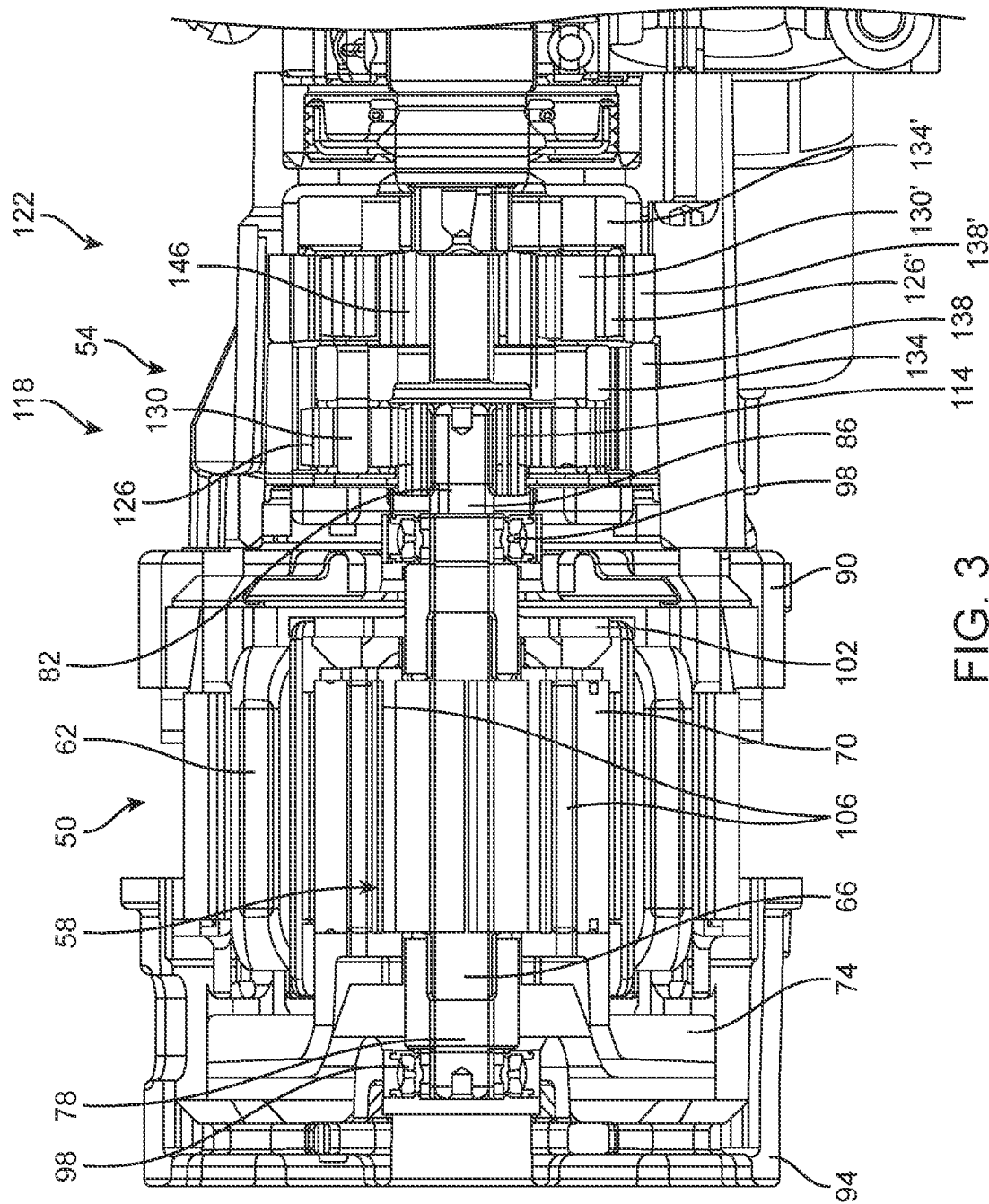
FIG. 3 is a section view of a portion of the hydraulic system according to the present disclosure.

With reference to FIGS. 2-6, a hydraulic drive assembly 14 is at least partially supported within the interior 42 of the housing 30 of the tool 10 and is activated by the switch 38. With particular reference to FIG. 3, the hydraulic drive assembly 14 includes a motor assembly 50 (e.g., a brushless DC motor) that is operably coupled to a gear assembly 54. The motor assembly 50 includes a rotor assembly 58 positioned within and rotatable relative to the stator 62. The rotor assembly 58 includes an output shaft 66 coupled to the rotor body 70. A fan 74 is coupled to a first end 78 of the output shaft 66, and a pinion 82 is coupled to the opposite second end 86 of the output shaft 66. The motor assembly 50, including the fan 74, is supported within front and rear caps 90, 94 that are supported in the housing 30. In particular, the rotor assembly 58 is rotatably supported by bearings 98 coupled to the first and second ends 78, 86 of the output shaft 66. A rotor position printed circuit board assembly 102 (PCBA) is positioned adjacent the second end 86 of the rotor assembly 58 toward the second end 86 of the output shaft 66 and within the front cap 90. The rotor position PCBA 102 includes at least one sensor (three sensors in the present embodiment, not shown) to determine the position of the rotor assembly 58. The sensors are Hall effect sensors configured to detect the magnetic field of permanent magnets 106 positioned within the rotor body 70. Other sensors configured to determine the position of the rotor assembly 58 may be used instead. With reference to FIGS. 2 and 3, the rotor position PCBA 102 is electrically coupled (e.g., via wires) to a tool controller 110 (e.g., a PCBA) supported within the interior 42 of the housing 30. The tool controller 110 is configured to control operation of the tool 10.

Returning to FIG. 3, the pinion 82 on the output shaft 66 engages the gear assembly 54 via a toothed portion 114 of the pinion 82 and provides the rotational output of the motor assembly 50 thereto. In the illustrated embodiment, the gear assembly 54 is a two-stage planetary gear assembly having a first gear stage 118 and a second gear stage 122. For the following description of the planetary gear stages 118, 122, similar portions of the second stage 122 will have the same reference numerals as components of the first stage 118, with a prime (') notation. Each of the first and second stages 118, 122 includes a plurality of planetary gears 126, 126' rotationally coupled to shafts 130, 130' coupled to a carrier 134, 134' and a ring gear 138, 138' supported in a gear housing 142 surrounding the planetary gears 126, 126' and disposed radially outward of the planetary gears 126, 126'. The carrier 134 of the first stage 118 includes a pinion portion 146 that provides a rotational output to the planetary gears 126' of the second stage 122 of the gear assembly 54. The carrier 134' of the second stage 122 provides a rotational output. In other embodiments of the hydraulic drive assembly, the gear assembly may omit the second stage. In still other embodiments of the hydraulic drive assembly, the gear assembly may include three or more gear stages. In yet other embodiments, the gear assembly may be a multi-speed gear assembly configured to provide different output speeds depending on a user's speed selection (e.g., operation of a manual gear-change mechanism, amount an operation switch is depressed, etc.), for instance, by locking multiple gear stages for synchronous rotation or bypassing one or more gear stages in response to operation of a speed change structure.

Figure 4:
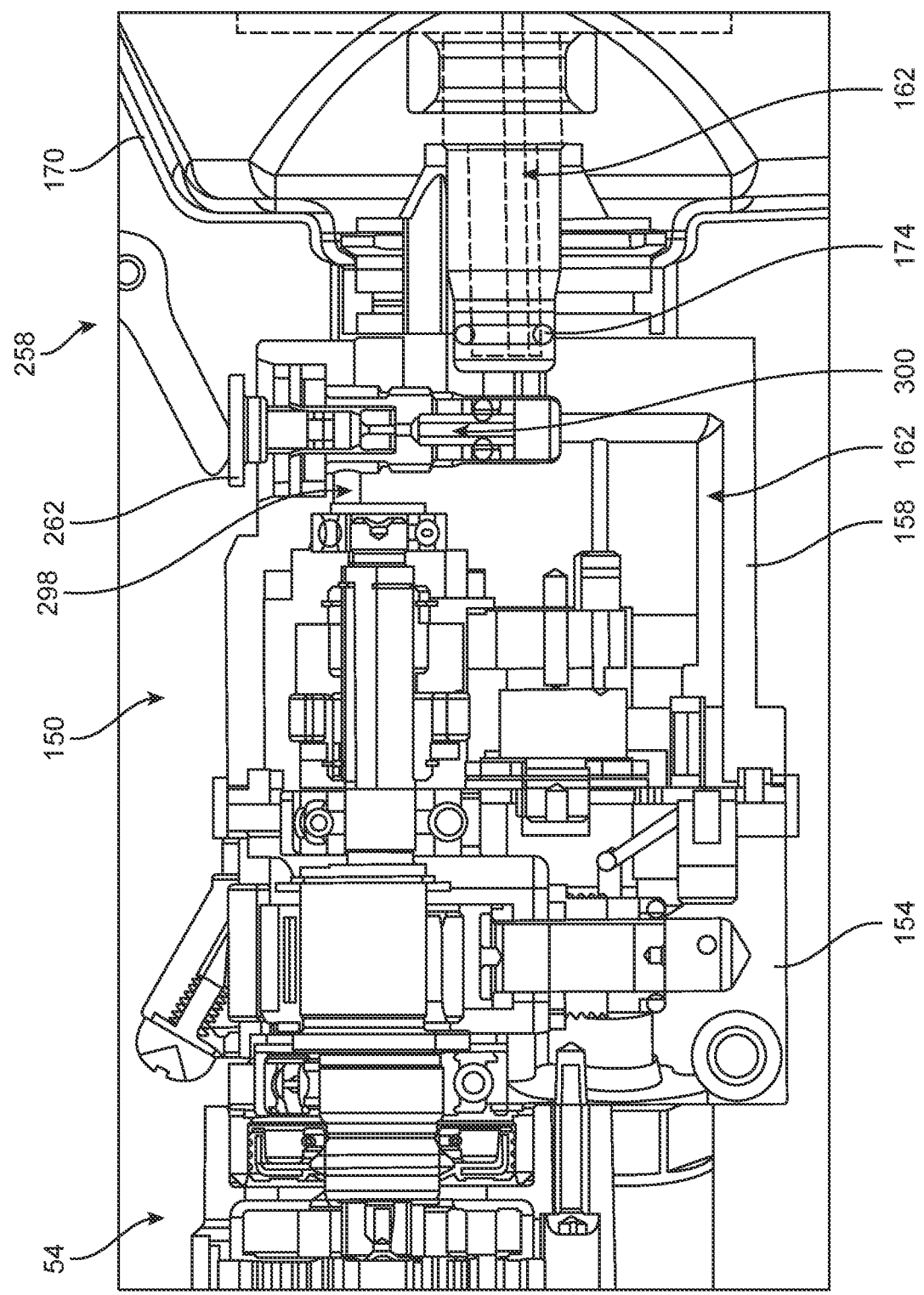
FIG. 4 is a section view of a portion of the hydraulic system according to the present disclosure.
Figure 5:
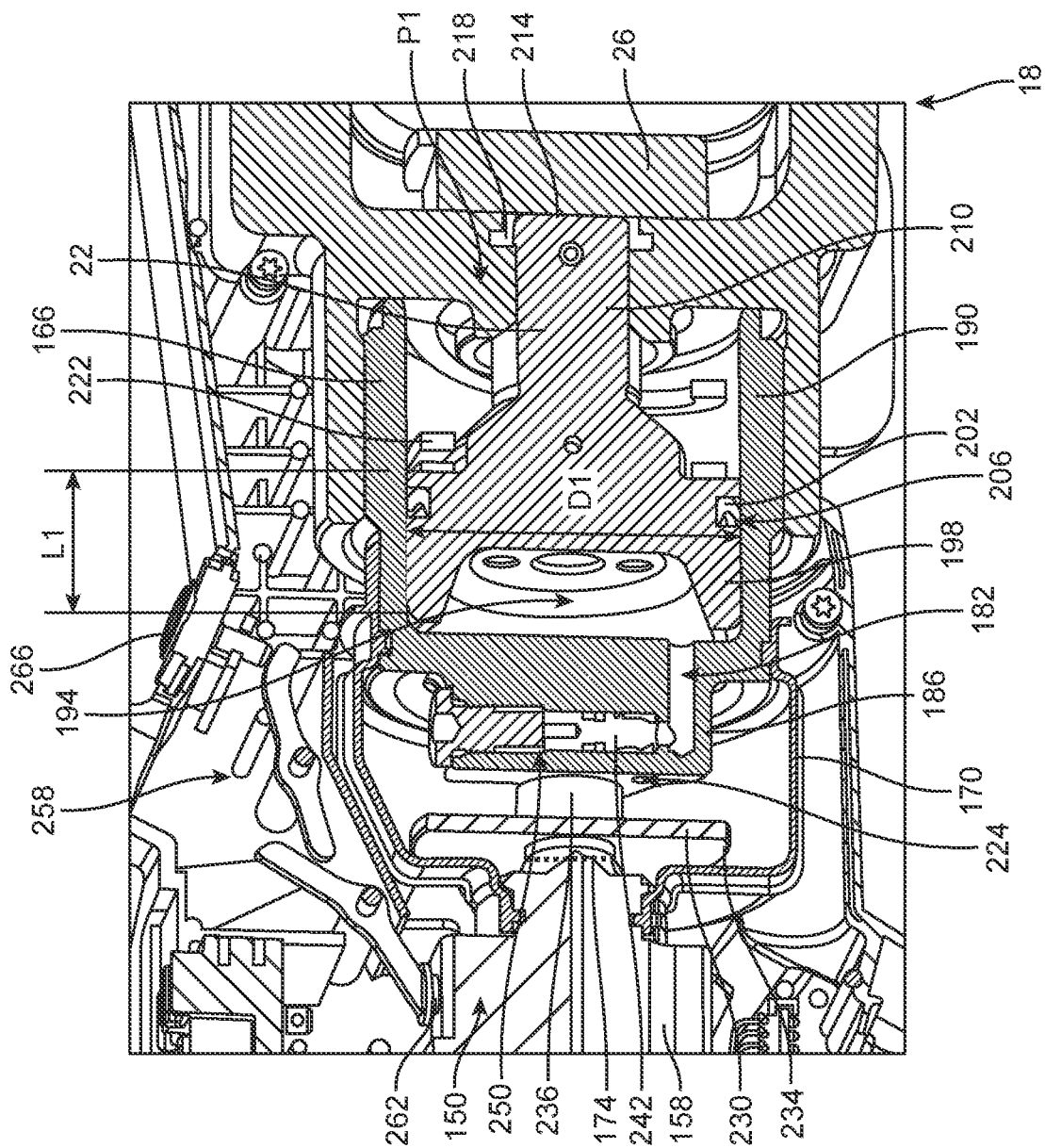
FIG. 5 is a section view of a portion of the hydraulic system according to the present disclosure.

With reference to FIGS. 2, 4, and 5, the hydraulic drive assembly 14 further includes a pump assembly 150 that receives the rotational output from the gear assembly 54. In other embodiments, the pump assembly 150 may be coupled directly to the motor assembly 50 to receive the rotational output directly from the motor assembly 50. The pump assembly 150 includes a pump housing 154 and a manifold housing 158 that at least partially define an inlet passageway 162. The pump assembly 150 may be, for instance, the pump described in U.S. Pat. No. 10,266,826, filed as U.S. application Ser. No. 15/130,122 on Apr. 15, 2016, the entire content of which is incorporated by reference herein. In other embodiments, the pump assembly may include a positive displacement pump having another construction, a rotary pump, or other type of pump configured to generate a flow of a fluid.

The hydraulic drive assembly 14 also includes a cylinder 166 (illustrated schematically in FIG. 4) coupled to the manifold housing 158 and a reservoir 170 coupled to the manifold housing 158 and the cylinder 166. A sealing interface 174 (e.g., an O-ring, shown in FIG. 4, illustrated schematically in FIG. 5) is disposed between the cylinder 166 and manifold housing 158.

The cylinder 166 is in fluid communication with the reservoir 170 via the inlet passageway 162 at least partially defined in the cylinder 166 and the manifold housing 158, and an outlet passageway 182 defined in the cylinder 166 through which fluid flows from the reservoir 170, where it is stored, to and from the cylinder 166. The cylinder 166 has a coupling portion 186, or stem, that at least partially defines the inlet passageway 162 and the outlet passageway 182. A body, or cylinder portion 190, extends from the coupling portion 186 and has a substantially circular cross-section that receives the piston 22.

The piston 22 is slidably supported in the body portion 190 of the cylinder 166, and, together, the body portion 190 and the piston 22 define a pumped volume 194 therebetween. The piston 22 includes a main body, or head 198, with a generally circular perimeter taken in the cross-section that is circumferentially supported within the cylinder 166. The head 198 has a length L1 and diameter D1 that are sized to support the piston 22 within the cylinder 166 and guide the piston 22 within the cylinder 166. The diameter D1 is generally equivalent to the inner diameter of the cylinder portion 190 of the cylinder 166 and is sized to slide within the cylinder 166 with a minimal gap. The diameter D1 may be within a range of approximately 25 to 75 millimeters, for instance between approximately 38 millimeters and 64 millimeters. In the illustrated embodiment, the head 198 has a diameter D1 of approximately 60 millimeters. The length L1 of the head 198 is between 15 and 30 millimeters, for instance, between a length of 20 and 25 millimeters. In the illustrated embodiment, the length L1 is approximately 23 millimeters. The head 198 of the illustrated embodiment has a length/diameter (L/D) ratio of approximately 0.38. In other embodiments, the piston 22 may have different dimensions, and consequently, a different L/D ratio. It will be appreciated that the length L1 of the head 198 reduces the possible angular deflection of the piston 22 within the cylinder 166 and provides additional guidance of the piston 22.

The piston 22 is movable between a first, start position P1 (FIG. 5) and a second position (e.g., an extended position, not shown). When in the first position P1, the piston 22 is closer to the coupling portion 186 than when the piston 22 is in the second position. At least one piston seal 202, or piston ring, is disposed in a groove 206 that extends circumferentially about the head 198 of the piston 22 and, in combination with the sizing of the diameter of the head 198 of the piston 22, operates to seal the interface between the piston 22 and the cylinder 166. The piston seal 202 may comprise an elastomeric, metallic, or plastic material, or other material type that has a sufficiently low friction coefficient and good wear durability characteristics to be able to slide within and against the cylinder 166 with minimal detrimental wear to the piston seal 202 such that a substantial number of operations can be completed prior to completion of servicing operation conducted on the tool 10. The piston 22 has an extension portion 210 with a distal end 214 that extends from the head 198 of the piston 22 at least partially beyond the cylinder 166. The extension portion 210 is configured to be coupled to a tool output portion 18 (e.g., the head assembly of a shear cutting tool) to provide a linear output received by the tool output portion 18.

A wiper seal 218 is disposed in the tool output portion 18 (e.g., in a groove) and engages the piston 22 closer to the distal end 214 than to the head 198 such that the interface of the piston 22 and tool output portion 18 is sealed to limit the ingress of debris such as metal shavings, water, or other contaminants. In other embodiments, the extension portion 210 may include a groove in which a wiper seal 218 is disposed. The wiper seal 218 engages the piston 22 and the tool output portion 18 to seal the interface therebetween. The wiper seal 218 is an elastomeric material or other material that limits the ingress of debris.

A return spring 222 is disposed between the head 198 of the piston 22 and the tool output portion 18, engages the head 198 of the piston 22, and biases the piston 22 to the first position P1. This arrangement of the return spring 222 thereby forces the fluid from the pumped volume 194 through the outlet passageway 182 to the reservoir 170 in an outlet flow that exits the outlet passageway at an outlet 224.

The reservoir 170 is coupled to the manifold housing 158 and the cylinder 166 by band clamps 226 (FIG. 2) or another clamping structure. In some embodiments, the reservoir 170 comprises a plastic or elastomeric material and may be flexible.

Returning with reference to FIG. 5, a baffle 230 is supported in the reservoir 170, for instance, coupled to the coupling portion 186 of the cylinder 166. The baffle 230 includes a plate portion 234 that extends radially outward from a cylindrical coupling portion 236 such that it is disposed adjacent to and facing the outlet 224 of the outlet passageway 182. Fluid exiting the outlet passageway 182 is directed toward the baffle 230 and contacts the baffle 230. The baffle 230 is configured to diffuse the outlet flow of hydraulic fluid such that the high pressure and velocity of the fluid does not damage the reservoir 170—that is, the flow of hydraulic fluid does not directly impinge upon the sides of the reservoir 170. In the present embodiment, the baffle 230 comprises a stainless steel material. In other embodiments, the baffle 230 may comprise another material capable of receiving and diffusing a high pressure/velocity fluid flow.

The pump assembly 150 generates an inlet flow of hydraulic fluid from the reservoir 170 to the pumped volume 194 of the cylinder 166 via the inlet passageway 162. As illustrated in the exemplary hydraulic schematic of FIG. 6, one or more check valves 238 are positioned in the inlet passageway 162 to maintain a unidirectional flow of the hydraulic fluid from the pump assembly 150 to the cylinder 166. For instance, a cylinder check valve 238a (e.g., a poppet valve) is disposed in the inlet passageway 162 in the cylinder 166 downstream of the pump assembly 150 and upstream of the pumped volume 194, to maintain a one-way flow of hydraulic fluid through the inlet passageway 162 into the pumped volume 194 of the cylinder 166. Other check valves (for instance, a pump check valve 238b) may be supported upstream of the pump assembly 150 in the pump housing 154 or, in other embodiments, in the manifold housing 158 to maintain a one-way flow of hydraulic fluid to the pump assembly 150.

Figure 6:
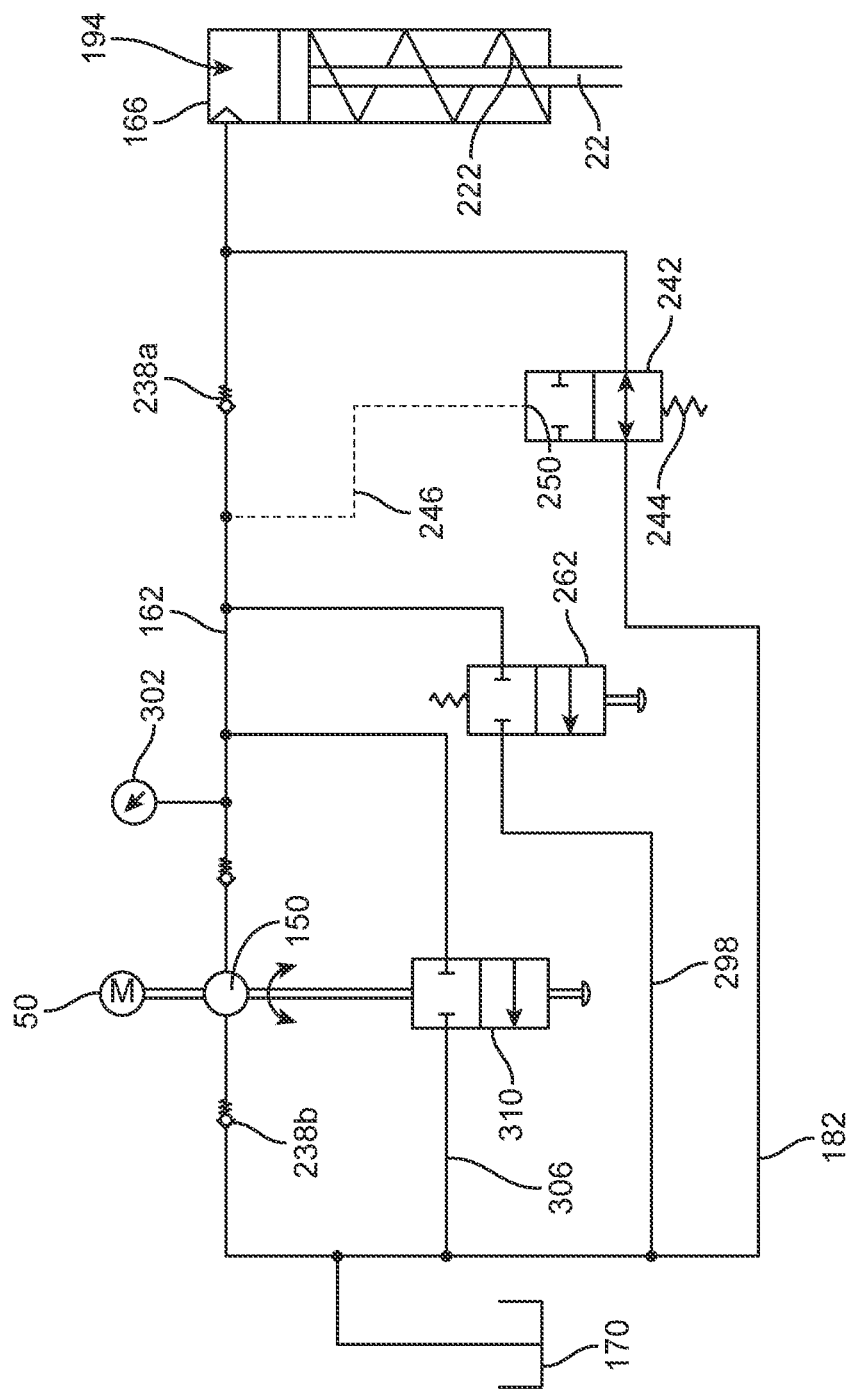
FIG. 6 is a schematic illustrating the hydraulic system according to the present disclosure.

With continued reference to FIGS. 5 and 6, an auto-return valve 242 (e.g., a poppet valve biased to an open position by a spring 244 in the illustrated embodiment), is positioned in the outlet passageway 182 between the cylinder 166 and the reservoir 170. An auto-return branch 246 fluidly communicates the inlet passageway 162 and the first side 250 of the auto-return valve 242. The hydraulic fluid in the inlet passageway 162 imparts a hydraulic pressure equivalent to the hydraulic pressure of the hydraulic fluid in the inlet passageway 162 on the first side 250 of the auto-return valve 242. When the force of the hydraulic pressure imparted on the auto-return valve 242 exceeds a closing threshold force imparted on the auto-return valve 242 (e.g., by the spring 244 in the auto-return valve 242), the auto-return valve 242 moves to a closed position thereby preventing the flow of hydraulic fluid through the outlet passageway 182. The auto-return valve 242 is maintained in the closed position as long as the the pressure of the hydraulic fluid applies a force to the first side 250 that exceeds the closing threshold force. The hydraulic pressure to overcome the closing threshold force is within a range of 50 to 100 psi, for instance, between 60 and 80 psi. In the illustrated embodiment, the hydraulic pressure of 70 psi imparts a force on the first side 250 of the auto-return valve 242 to overcome the closing threshold force and move the auto-return valve 242 to the closed position. When the force imparted on the auto-return valve 242 by the hydraulic pressure of the hydraulic fluid in the inlet passageway 162 falls below the an opening threshold (e.g., the same for as the closing threshold force), the auto-return valve 242 returns to the open position as a result of the force imparted by the spring 244, opening the outlet passageway 182 and allowing an outlet flow of hydraulic fluid to the reservoir 170. The hydraulic pressure may be reduced by, for instance, operating the motor assembly 50 in an opposite rotational direction than the motor assembly 50 is operated during performance of an operation.

Screens are disposed in the inlet and outlet passageways 162, 182. For instance, a first screen, or inlet check valve screen is disposed in the inlet passageway 162 upstream of the inlet check valve 238a. The inlet check valve screen includes a screening material sized to allow hydraulic fluid to flow through the inlet check valve screen while prohibiting the flow of particles (e.g., particles disposed in the hydraulic fluid as a result of component wear) through the inlet check valve 238a and into the cylinder 166. Other screens may be supported in the inlet and outlet passageways 162, 182. For instance, a second screen or auto-return valve screen is positioned in an upstream position relative to the auto-return valve 242.

Returning with reference to FIGS. 2, 4, and 5, a manual release assembly 258 is at least partially supported in the housing 30 and engages a manual release valve 262 supported in the inlet passageway 162 in the manifold housing 158. The manual release assembly 258 includes a manual release button 266 supported in the housing 30 adjacent the handle 34 and accessible by a user from the exterior of the housing 30. As shown in FIG. 2, the manual release button 266 engages a first end 270 of a first lever 274 pivotably supported in the housing 30. The second end 278 of the first lever 274 engages a first end 282 of a second lever 286 that is also pivotably supported in the interior 42 of the housing 30. The second end 290 of the second lever 286 engages the manual release valve 262 positioned in the inlet passageway 162 in the manifold housing 158. Engagement (e.g., depression) of the manual release button 266 translates the distal end 294 of the manual release button 266 into engagement with the first lever 274. Engagement by the manual release button 266 pivots the first lever 274 in the housing 30 and brings the first lever 274 into contact with the second lever 286, which in turn pivots the second lever 286 into engagement with, and depression of, the manual release valve 262. It will be appreciated that the manual release assembly 258 including first and second levers 274, 286 provides a mechanical advantage over other embodiments in which a manual release valve is engaged by a button without intervening components. In that regard, the levers 274, 286 provide a moment arm allowing application of a force to be multiplied by the distance from the rotational point of the levers, thereby increasing the effective force applied by the levers without requiring a greater force to be applied to the manual release button 266. Shown in FIGS. 4 and 6, a manual return passageway 298 disposed in the manifold housing 158 fluidly communicates the inlet passageway 162 and the reservoir 170. The manual release valve 262 is biased to a closed position, thereby preventing the flow of hydraulic fluid from the inlet passageway 162 to the reservoir 170. Depression of the manual release valve 262 via the manual release assembly 258 opens the manual release valve 262 (e.g., by depressing a check valve disposed in a passage 300 in the valve 262). Other constructions of manual release assemblies and manual release valves may be used instead.

Returning with reference to FIG. 6, a pressure sensor 302 is at least partially positioned in the inlet passageway 162 downstream of the pump assembly 150 for measuring the pressure of the hydraulic fluid in the inlet passageway 162. Signals indicative of the hydraulic pressure measured by the pressure sensor 302 are communicated to the tool controller 110 (e.g., via wires).

In operation, hydraulic fluid is pumped through the hydraulic drive assembly 14 from the reservoir 170 (for instance, through check valves) by the motor assembly 50, gear assembly 54, and pump assembly 150. The hydraulic fluid then flows into the inlet passageway 162, and the pressure sensor 302 measures hydraulic pressure of the hydraulic fluid at appropriate time intervals (e.g., 1 millisecond). The hydraulic fluid in the inlet passageway 162 imparts a force on the inlet check valve 238a and the first side 250 of the auto-return valve 242. The force required to overcome the force of the spring 244 and close the auto-return valve 242, imparted by the hydraulic fluid in the inlet passageway 162, is lower than the force required to open the inlet check valve 238a. When the hydraulic pressure imparts a force on the auto-return valve 242 that overcomes the closing threshold force of the auto-return valve 242, the auto-return valve 242 is biased to a closed position. The pressure of the hydraulic fluid continues to increase in the inlet passageway 162 until it overcomes the force required to open the cylinder check valve 238a and enters the cylinder 166. The hydraulic fluid imparts a force on the head 198 of the piston 22, thereby moving the piston 22 away from the first position P1 toward the extended position. At, for instance, the completion of the cutting operation, pressure of the hydraulic fluid in the inlet passageway 162 is reduced below an opening threshold, and the auto-return valve 242 moves to an open position allowing the hydraulic fluid to flow through the outlet passageway 182 to the reservoir 170.

The pressure of the hydraulic fluid in the inlet passageway 162 may be reduced by various operations. One example of an operation to reduce the pressure in the inlet passageway 162 is to manually open the manual release valve 262, thereby allowing fluid in the inlet passageway 162 to flow to the reservoir 170. The hydraulic drive assembly 14 additionally includes a pump return passageway 306 fluidly communicating the inlet passageway 162 and the reservoir 170. During operation of the motor assembly 50 and pump assembly 150 in a pumping direction, a rotary seal 310 disposed in the pump return passageway 306 prevents hydraulic fluid from flowing through the pump return passageway 306 to the reservoir 170. When the operation of the motor assembly 50 is reversed, the rotary seal 310 is opened, thereby allowing the flow of hydraulic fluid from the inlet passageway 162 into the pump return passageway 306 and into the reservoir 170. The tool controller 110, configured to electrically control operation of the tool 10, may reverse the direction of the motor assembly 50 from turning in a pumping direction to turning in a reverse direction when the tool controller 110 determines a cutting operation has been completed, when the switch 38 is released, or at other operational states. That is, the tool controller 110 monitors the pressure of hydraulic fluid in the inlet passageway 162 and, when a pressure drop is detected, which is indicative of the completion of the tool operation, the piston 22 will automatically return to the start position P1 regardless of whether or not the user has released the switch 38.

Figure 7:
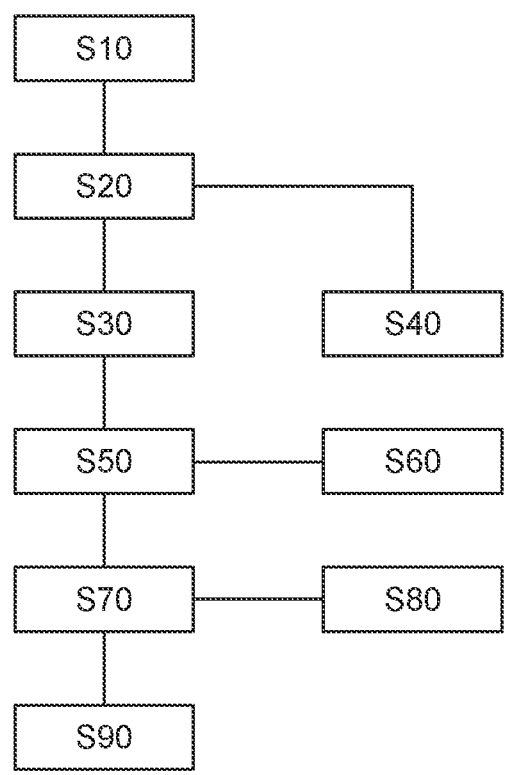
FIG. 7 is a flowchart illustrating a control process of the hydraulic system according to the present disclosure.

With reference to FIG. 7, an exemplary hydraulic drive assembly controls process is shown. In a first step S10, the tool controller 110 receives signals from the pressure sensor 302. In the next step S20, the tool controller 110 compares the pressure indicated by the pressure sensor 302 to an operation threshold (e.g., a threshold, predefined maximum operation pressure stored in the tool controller 110) and determines whether the pressure measured by the pressure sensor 302 exceeds the operation threshold. If the tool controller 110 determines the pressure exceeds the operation threshold, the tool controller 110 increments a counter in step S30. If the measured pressure does not exceed the operation threshold, the tool controller 110 continues operation of the hydraulic drive assembly 14 in the next step S40. If the tool controller 110 determined in step S20 that the measured pressure has exceeded the operation threshold and the tool controller 110 has implemented a counter in step S30, the tool controller 110 takes the next step S50 of comparing the value of the counter to a predefined value.

In the illustrated control process, the counter may have two preset values: (1) a first value indicating that operation of the tool 10 can continue but service is required within a predefined series of operations following the present operational sequence, and (2) a second value, or tool threshold, indicating that safe operation of the tool 10 can no longer be performed and that tool operation is not allowed without first servicing the tool 10. Stated another way, following incrementation of the counter at step S30, the tool controller 110 compares the counter value to the first predefined value at step S50 and determines whether the counter has exceeded a value indicative of the tool 10 falling within a service window and approaching tool disablement. That is, the tool controller 110 measures the number of times the tool 10 exceeds the operation threshold in order to limit damage to the tool 10 and indicate that service is recommended, for instance, within a time period of 1000 tool cycles in order to continue safe operation of the tool 10 and avoid injury to the tool operator.

If the tool controller 110 determines that the counter has not exceeded the first predefined value, the tool controller 110 continues operation in step S60. If, in step S50, the tool controller 110 determines that the counter has exceeded the first predefined value, the tool controller 110, in step S70, compares the counter value to the second predefined value and determines whether the counter has exceeded the second predefined value. If the tool controller 110 determines that the counter value has not exceeded the second predefined value, the tool controller 110, in step S80, performs a first indicator operation. If the tool controller 110 determines, in step S70, that the counter value has exceeded the second predefined value, which corresponds to the inability of the tool 10 to be safely operated without first performing service, the tool controller 110 performs the next step S90 of performing a safety operation and an indicator operation.

In the illustrated process of FIG. 7, the indicator operation of step S80 indicates to the user that an action needs to be taken (e.g., having the tool 10 serviced within a period of time, number of operations, etc.) by the user in order to continue to safely operate the tool 10. In the illustrated embodiment, when the counter has exceeded the first predefined value indicative of the need to perform service, the tool controller 110 may provide a signal to a work light 46 supported in the tool 10 such that the work light 46 will flash for a period of time, such as 30 seconds. In the illustrated process, the safety operation indicates that safe operation of the tool 10 can no longer be conducted and that service is required prior to continued operation of the tool 10. Stated another way, safe operation of the tool 10 is no longer possible without first inspecting and repairing any parts requiring service. In response to the determination that the counter has exceeded the second predefined value that service is required, the tool performs a safety operation (e.g., prevents activation of the hydraulic drive assembly 14). The tool controller 110 also performs an indicator operation, such as providing visual indication, such as a flashing/blinking work light 46. In some embodiments, the work light 46 may flash, either at the same or a different frequency, for the same period of time as the indicator operation of step S80 or for a different period of time. In other embodiments, the indicator operation may include a solidly lit (i.e., not blinking) work light. In other embodiments, a buzzer or other auditory alarm, or some other indicator operation may be performed. The tool controller 110 may maintain the tool 10 in an inoperative state until service is completed and the counter is reset to zero.

What is claimed is:

1. A hydraulic tool comprising:
a housing including a handle, the handle supporting a switch configured to activate the hydraulic tool; and
a hydraulic drive assembly at least partially supported in the housing and activated by the switch, the hydraulic drive assembly including
a motor assembly,
a pump assembly operably coupled to the motor assembly, the pump assembly including a manifold housing in which an inlet passageway is at least partially defined,
a reservoir configured to contain hydraulic fluid, the reservoir in fluid communication with the pump assembly,
a baffle supported within the reservoir,
a cylinder in fluid communication with the pump assembly, the cylinder supporting an auto-return valve,
a piston disposed in the cylinder and slidable relative thereto from a first position, the piston configured to be coupled to a tool output, and
a piston spring disposed in the cylinder, the piston spring engaging the piston and biasing the piston toward the first position,
wherein the inlet passageway fluidly communicates the pump assembly and the cylinder, the inlet passageway supporting an inlet check valve, and
wherein a direction of motor assembly operation is reversed to reduce hydraulic pressure in the inlet passageway.

2. The hydraulic tool of claim 1, wherein the auto-return valve includes a spring, the spring biasing the auto-return valve to an open position.

3. The hydraulic tool of claim 2, wherein the auto-return valve defines a first side in fluid communication with the inlet passageway, the auto-return valve configured to experience a hydraulic force opposing the bias of the spring.

4. The hydraulic tool of claim 3, wherein the hydraulic force required to open the inlet check valve is higher than the hydraulic force in the inlet passageway required to overcome the bias of the spring.

5. The hydraulic tool of claim 4, wherein the auto-return valve opens in response to a reduction below an opening threshold of hydraulic pressure in the inlet passageway.

6. The hydraulic tool of claim 1, further comprising a wiper seal positioned circumferentially about the piston, the wiper seal engaging the piston.

7. The hydraulic tool of claim 1, further comprising a manual release assembly mechanically engaging a manual release valve, the manual release assembly including
a manual release button coupled to the housing and engageable by a user,
a first lever selectively engageable by the manual release button, and
a second lever engageable by the first lever, the second lever engageable with the manual release valve.

8. The hydraulic tool of claim 1, wherein the hydraulic tool is one of a crimping tool and a cutting tool.

9. The hydraulic tool of claim 1, further comprising:
a pressure sensor at least partially disposed in the inlet passageway and configured to measure a hydraulic pressure of hydraulic fluid in the inlet passageway; and
a tool controller configured to monitor the hydraulic pressure and increment a counter upon the hydraulic pressure exceeding an operation threshold, the tool controller disabling operation of the hydraulic tool upon the counter exceeding a threshold.

10. The hydraulic tool of claim 9, wherein the tool controller is configured to selectively initiate an indicator operation in response to the counter exceeding a predefined value less than the threshold.

11. The hydraulic tool of claim 1, wherein the motor assembly is operable to drive the pump assembly and pressurize the cylinder, thereby moving the piston from the first position, in response to actuation of the switch, and wherein the hydraulic drive assembly is configured to return the piston to the first position in response to the switch being released.

12. A hydraulic tool comprising:
a housing including a handle, the handle supporting a switch configured to activate the hydraulic tool; and
a hydraulic drive assembly at least partially supported in the housing and activated by the switch, the hydraulic drive assembly including
a motor assembly,
a pump assembly operably coupled to the motor assembly, the pump assembly including a manifold housing in which an inlet passageway is at least partially defined,
a reservoir configured to contain hydraulic fluid, the reservoir in fluid communication with the pump assembly,
a baffle supported within the reservoir, a cylinder in fluid communication with the pump assembly, the cylinder supporting an auto-return valve, a piston disposed in the cylinder and slidable relative thereto from a first position, the piston configured to be coupled to a tool output, and a piston spring disposed in the cylinder, the piston spring engaging the piston and biasing the piston toward the first position, wherein the inlet passageway fluidly communicates the pump assembly and the cylinder, the inlet passageway supporting an inlet check valve, and wherein the cylinder is in fluid communication with the reservoir via an outlet passageway, the outlet passageway having an outlet directed toward the baffle.

13. The hydraulic tool of claim 12, wherein the baffle includes a plate portion disposed adjacent to and facing the outlet of the outlet passageway such that the baffle is configured to diffuse a flow of hydraulic fluid through the outlet such that the flow of hydraulic fluid through the outlet does not directly impinge upon a side of the reservoir.

14. The hydraulic tool of claim 13, wherein the baffle is made of stainless steel.

15. A hydraulic drive assembly of a power tool comprising:

a switch;

a motor assembly operable to provide a rotational output;

a gear assembly configured to receive the rotational output from the motor assembly;

a pump assembly operably coupled to the gear assembly, the pump assembly configured to generate a flow of hydraulic fluid;

a reservoir in fluid communication with the pump assembly and configured to store hydraulic fluid;

a baffle supported in the reservoir; and a cylinder in which a piston is slidably supported, the piston slidable from a first position in response to actuation of the switch and operation of the motor assembly to drive the pump assembly and pressurize the cylinder, the cylinder in fluid communication with the reservoir via an inlet passageway and an outlet passageway, the outlet passageway having an outlet directed toward the baffle, wherein the piston returns to the first position in response to the switch being released.

16. The hydraulic drive assembly of claim 15, further comprising a manual release valve positioned in the inlet passageway and operable to return the piston toward the first position.

17. The hydraulic drive assembly of claim 16, further comprising a manual release assembly including a first lever, a manual release button engageable with the first lever, and a second lever engageable with the first lever and with the manual release valve to operate the manual release valve.

18. The hydraulic drive assembly of claim 15, further comprising an auto-return valve positioned in the outlet passageway between the cylinder and the reservoir, the auto-return valve having a first side in fluid communication with the inlet passageway and a second side, the second side in fluid communication with the outlet passageway.

* * * * *